United States Patent [19]

Fluehmann

[11] 4,207,777
[45] Jun. 17, 1980

[54] ONE WAY GEAR TRAIN

[75] Inventor: Werner Fluehmann, Hessigkofen, Switzerland

[73] Assignee: Societe Suisse pour l'Industrie Horlogere Mangagement Services S.A., Switzerland

[21] Appl. No.: 958,470

[22] Filed: Nov. 7, 1978

[51] Int. Cl.² ............................................. F16H 55/06
[52] U.S. Cl. ........................................ 74/462; 74/414; 74/421 R
[58] Field of Search ....................... 74/411.5, 413, 414, 74/415, 421 R, 437, 460, 462, 457

[56] References Cited

U.S. PATENT DOCUMENTS

| 1,012,916 | 12/1911 | Roberts | 74/421 R |
|---|---|---|---|
| 2,064,699 | 12/1936 | Stahl et al. | 74/462 X |
| 2,399,925 | 5/1946 | Hewlett | 74/437 |
| 2,436,231 | 2/1948 | Schellens | 74/462 X |
| 2,752,751 | 7/1956 | Vaucher | 74/462 X |
| 4,041,794 | 8/1977 | Belot et al. | 74/462 X |
| 4,108,016 | 8/1978 | Muranishi | 74/462 |

FOREIGN PATENT DOCUMENTS

| 1574 of 1853 | United Kingdom | 74/414 |
|---|---|---|
| 4296 of 1879 | United Kingdom | 74/462 |
| 15830 of 1911 | United Kingdom | 74/414 |

Primary Examiner—Lawrence J. Staab
Attorney, Agent, or Firm—Griffin, Branigan and Butler

[57] ABSTRACT

A gear train comprising a drive gear, a driven gear and an idler arranged in a common plane so that both drive gear teeth and idler teeth mesh with the driven gear teeth. The teeth are asymmetric and the idler and drive gears are reflections of one another about a line. Rotation can be transmitted in one sense only and in direction from drive gear to driven gear only. The arrangement may be advantageously employed in timepieces such as electric wrist watches where a stepping motor drives time indicating hands.

7 Claims, 1 Drawing Figure

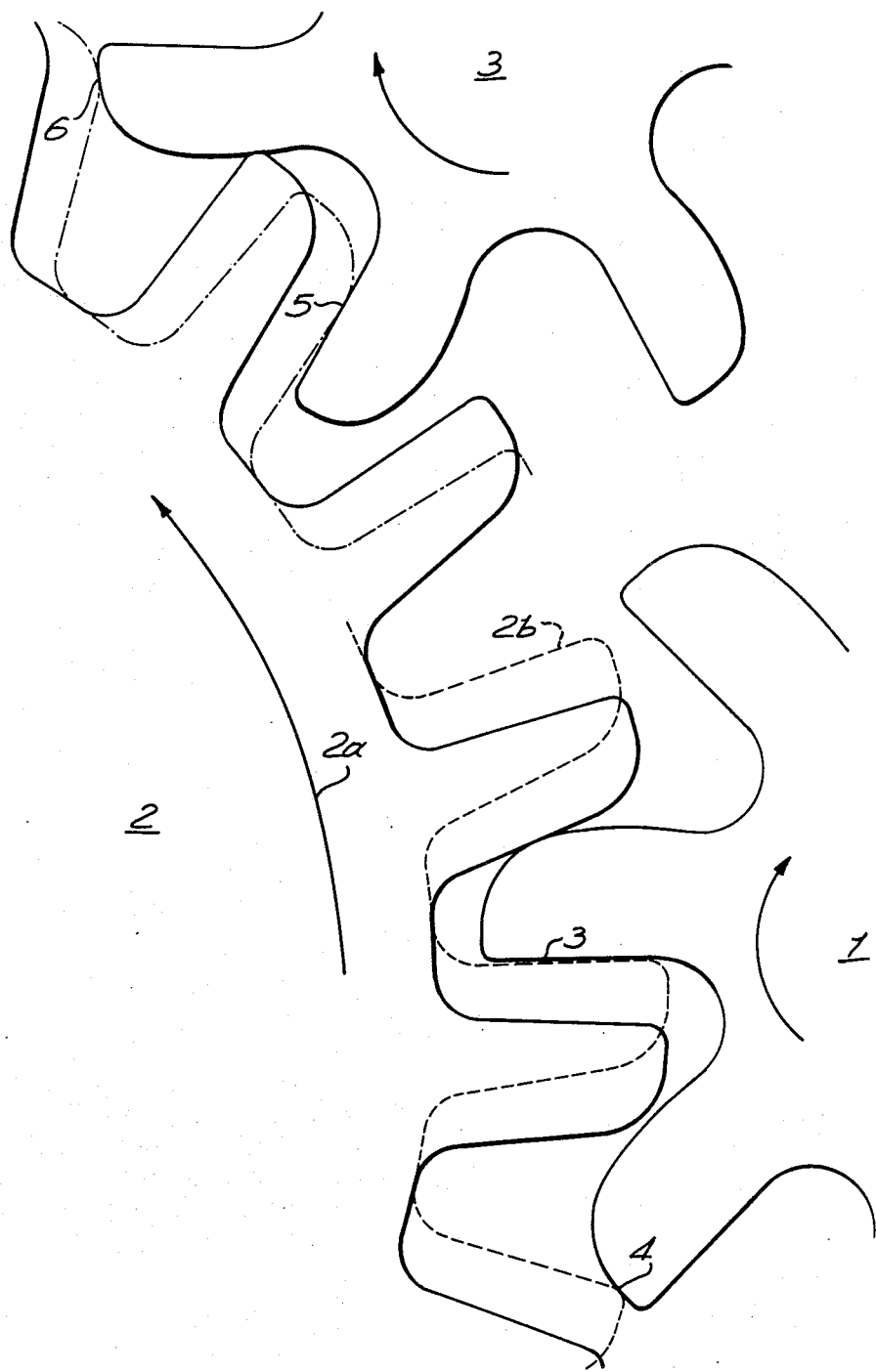

ONE WAY GEAR TRAIN

BACKGROUND OF THE INVENTION

In modern quartz controlled watches employing a stepping motor and time indicating hands there is occasionally a tendency for external forces arising from movements of the wearer to be transmitted back through the gear train and to react unfavourably on the behaviour and performance of the stepping motor. To avoid this unfavourable reaction various solutions may be proposed; among others there has been suggested the use of mutilated gears taking various forms, or pawl and ratchet mechanisms. Mutilated gears, depending on their form, may present certain problems of manufacture as well as matching thereof to provide a smooth transmission of rotational motion. The use of pawl and ratchet mechanisms takes up space and also abstracts energy from the motor. The present invention provides a solution to the problem which utilizes gears having readily formed teeth, even although such teeth are asymmetric. Through the employment of an idler gear similar to a drive gear, but representing a reflection about a diameter of said drive gear, it has been found that transmission from the stepping motor to the rest of the mechanism may take place only in one direction and only in one sense of rotation. Thus, shocks applied to the timepiece through outside influences will not be transmitted back to the drive motor whether or not these tend to accelerate the motor or to stop it.

It is obvious that although the mechanism may find its greatest use in the timekeeping art other uses will suggest themselves to those involved with like mechanical devices.

SUMMARY OF THE INVENTION

The invention accordingly comprises a gear train comprising a drive gear having asymmetric teeth, a driven gear having asymmetric teeth arranged and adapted to mesh with the teeth of the drive gear and an idler having asymmetric teeth arranged and adapted to mesh with the teeth of the driven gear the idler being in the form of a reflection about a diameter of the drive gear whereby one sense only of rotation and one direction of transmission can occur.

BRIEF DESCRIPTION OF THE DRAWING

A single drawing shows in plan the lay-out according to the invention of three gears, a driving gear, a driven gear and an idler.

DETAILED DESCRIPTION OF THE INVENTION

As indicated by the arrow the driving gear 1 is adapted to rotate in the clockwise sense and may, where desired, be mounted directly on the drive shaft of a stepping motor not shown. The leading flanks and faces of the teeth as may be seen are rounded whereas the trailing flanks are straight and may be considered basically as radial lines. The idler gear 3 may be viewed in the same manner as the drive gear 1, but is loosely mounted so as to be capable of freely turning on its axis. Teeth may have the same profile as those of drive gear 1, but as may be observed idler 3 is a reflection about the diameter of drive gear 1 whereby the leading flanks of its teeth as seen in the direction of rotation are radially directed lines, whereas the trailing flanks are curved lines.

The driven gear 2 which will normally rotate in the counter clockwise sense as indicated by the arrow 2a has a form of tooth which is also asymmetric and may be perhaps described as trapezoidal having a rounded summit along the trailing edge in the sense of rotation thereof. The leading edges of the driven gear teeth will be approximately radially directed.

As may be readily appreciated from a study of the drawing rotation imparted from the driving gear 1 to the driven gear 2 in the clockwise sense of the former will proceed normally and smoothly. Should, however, an externally applied shock tend to accelerate the driven gear 2 in its normal counter clockwise sense of rotation 2a it will be appreciated from the skeleton outline 2b of this gear a flank to flank contact will occur as shown at 3 and butting will occur as shown at 4 between the teeth of driven gear 2 and drive gear 1. Such butting prevents any accelerated turning of drive gear 1.

In the event that an externally applied force should tend to turn driven gear 2 in the clockwise sense then a similar butting will occur between the driven gear 2 and the idler 3 as shown at 5 and 6. Thus, no movement in either sense of rotation can be transmitted from the driven gear 2 to the drive gear 1.

It will likewise be realized that in any event where for one reason or another the stepping motor should attempt to start off in the wrong sense of rotation such would be prevented by the same phenomena already described wherein the idler 3 would prevent such reverse sense rotation.

Although the drive gear and the idler as shown in the drawing have approximately the same dimensions this is not a critical matter and the idler may be dimensioned to suit space availability so long as tooth form and proportions are maintained. Thus the number of teeth may vary between drive gear and idler.

What we claim is:

1. A gear train comprising a drive gear having asymmetric teeth, a driven gear having asymmetric teeth arranged and adapted to mesh with the teeth of the drive gear and an idler having asymmetric teeth arranged and adapted to mesh with the teeth of the driven gear the idler having the form of a reflection about a diameter of the drive gear whereby one sense only of rotation and one direction of transmission can occur.

2. A gear train as set forth in claim 1 wherein the several gears lie in the same plane.

3. A gear train as set forth in claim 1 wherein the teeth of the drive gear seen in profile are curved along the leading flank and face in the sense of rotation.

4. A gear train as set forth in claim 1 wherein the teeth of the idler seen in profile are curved along the trailing flank and face in the sense of rotation.

5. A gear train as set forth in claim 1 wherein the trailing flanks and faces of the teeth in the sense of rotation of the drive gear and the leading flanks and faces of the teeth in the sense of rotation of the idler seen in profile are in the form of straight approximately radially directed lines.

6. A gear train as set forth in claim 1 wherein the teeth of the driven gear seen in profile are trapezoidal with a rounded face proximate the summit along the trailing edge in the sense of rotation.

7. A gear train as set forth in claim 6 wherein the leading flanks and faces in the sense of rotation of the driven gear are approximately radially directed.

* * * * *